United States Patent
Krinsky

(10) Patent No.: US 6,631,683 B2
(45) Date of Patent: *Oct. 14, 2003

(54) METHOD OF PREPARING CUSTOMIZED WALLPAPER PANELS

(75) Inventor: Lynn Paula Krinsky, Seattle, WA (US)

(73) Assignee: Lynn P. Krinsky, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/997,110

(22) Filed: Nov. 29, 2001

(65) Prior Publication Data

US 2002/0035943 A1 Mar. 28, 2002

Related U.S. Application Data

(63) Continuation of application No. 09/479,273, filed on Jan. 5, 2000, now Pat. No. 6,354,212.

(51) Int. Cl.[7] .................................................. B41M 3/00
(52) U.S. Cl. ........................ 101/483; 358/450; 358/452
(58) Field of Search ............................... 101/483, 487, 101/488, 494; 358/448, 450, 452, 453

(56) References Cited

U.S. PATENT DOCUMENTS

| | | |
|---|---|---|
| 4,696,400 A | 9/1987 | Warman |
| 4,772,158 A | 9/1988 | Coone |
| 5,226,098 A | 7/1993 | Hirosawa |
| 5,555,094 A | 9/1996 | Lefebvre et al. |
| 5,574,829 A | 11/1996 | Wallace et al. |
| 5,592,305 A | 1/1997 | Iwadate et al. |
| 5,601,928 A | 2/1997 | Katayama et al. |
| 5,608,542 A | 3/1997 | Krahe et al. |
| 5,635,007 A | 6/1997 | Weinberg |
| 5,661,566 A | 8/1997 | Gerber |
| 5,685,657 A | 11/1997 | Jablonski |
| 5,815,645 A | 9/1998 | Fredlund et al. |
| 5,986,671 A | 11/1999 | Fredlund et al. |
| 6,212,304 B1 | 4/2001 | Durg et al. |

Primary Examiner—Ren Yan
(74) Attorney, Agent, or Firm—Christensen O'Connor Johnson Kindness PLLC

(57) ABSTRACT

The invention discloses a method for customizing wallpaper designs that do not include repeating patterns, typical of prior art wallpaper. The method includes displaying copies of basic designs for wallpaper to customers for review and selection of designs. Each basic design consists of contiguous panel portions, one or more of which can be selected to provide a coherent subdesign. The customer then selects a wallpaper basic design and a subdesign of the selected basic design, which consists of a contiguous portion of the basic design and not the entire displayed basic design. A digital image of the selected basic design is modified by incorporating the subdesign selection to produce a customized digital image. Finally, the customized digital image is printed onto a suitable substrate for the wallpaper.

11 Claims, 3 Drawing Sheets

METHOD OF PREPARING CUSTOMIZED WALLPAPER PANELS

CROSS REFERENCE TO RELATED APPLICATION

This is a continuation application of allowed application Ser. No. 09/479,273 filed Jan. 5, 2000, now U.S. Pat. No. 6,354,212 and titled METHOD OF PREPARING CUSTOMIZED WALLPAPER PANELS, which is hereby incorporated by reference.

FIELD OF THE INVENTION

The invention relates to customized wallpaper, and methods for allowing customers to select a particular wallpaper design from a displayed selection, and to customize the design by adding personalized information. The method requires the use of a digital image of the basic design that is to be customized.

BACKGROUND OF THE INVENTION

Among the variety of ways of decorating walls in both dwellings and commercial enterprises is the use of wall coverings, particularly wallpaper. The term "wallpaper" generally refers to rolls of sheets of a substrate onto which is printed a repeating pattern. The substrate is not limited to paper, but can be any other type of sheet onto which print can be applied, and that will adhere to a wall surface, such as vinyl sheeting.

While wallpaper sometimes provides a better aesthetic appearance than paint, wallpaper decorations are necessarily limited by the repeating patterns that are required to allow alignment of similarly patterned sheets of wallpaper side by side on a wall. This requirement that the wallpaper have a repeating pattern limits artistic expression and frequently reduces aesthetic appeal. In certain situations, it may be preferable to have a mural that does not have a repeating pattern, instead of wallpaper. However, mural paintings are prepared by skilled artists so that they are expensive.

There is yet a need for a type of wallpaper that does not have a repeating pattern, and that can be adapted for use on walls of different sizes. Desirably, the wallpaper should also allow a purchaser to customize the designs further by adding personal detailed touches, such as images of family members, and the like. It is further desirable that the customer should be able to select the wallpaper from a display, request custom modification, and receive the specially prepared wallpaper within a short space of time.

SUMMARY OF THE INVENTION

The invention provides customized wallpaper panels, that can be sold on rolls, for use as wall decoration.

In one embodiment, a vendor of customized wallpaper displays copies of basic designs for wallpaper on a medium, such as a book or video display unit, to customers for review and selection of designs. The basic designs do not include repeating patterns. Each of the basic designs consists of contiguous decorative panel portions. The customer then selects a wallpaper basic design and a subdesign of the selected basic design. A subdesign is a contiguous portion of the basic design, which consists of one or more contiguous panel portions to provide a coherent design, and not the entire displayed basic design. The vendor relays the customizing information, including selection of at least one basic design and a subdesign within the selected basic design, to a source for customizing an existing digital image of the basic design. The digital image is customized by incorporating the subdesign selection to produce a customized digital image. The customized digital image is then printed onto a suitable substrate for the wallpaper.

The wallpaper may comprise several rolls of sheets. Notwithstanding, when the sheets are properly aligned and adhered to the wall side by side in proper sequence, a complete design or scene is produced as in a mural painting, without need for the repeating pattern that is typical of prior art wallpaper.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
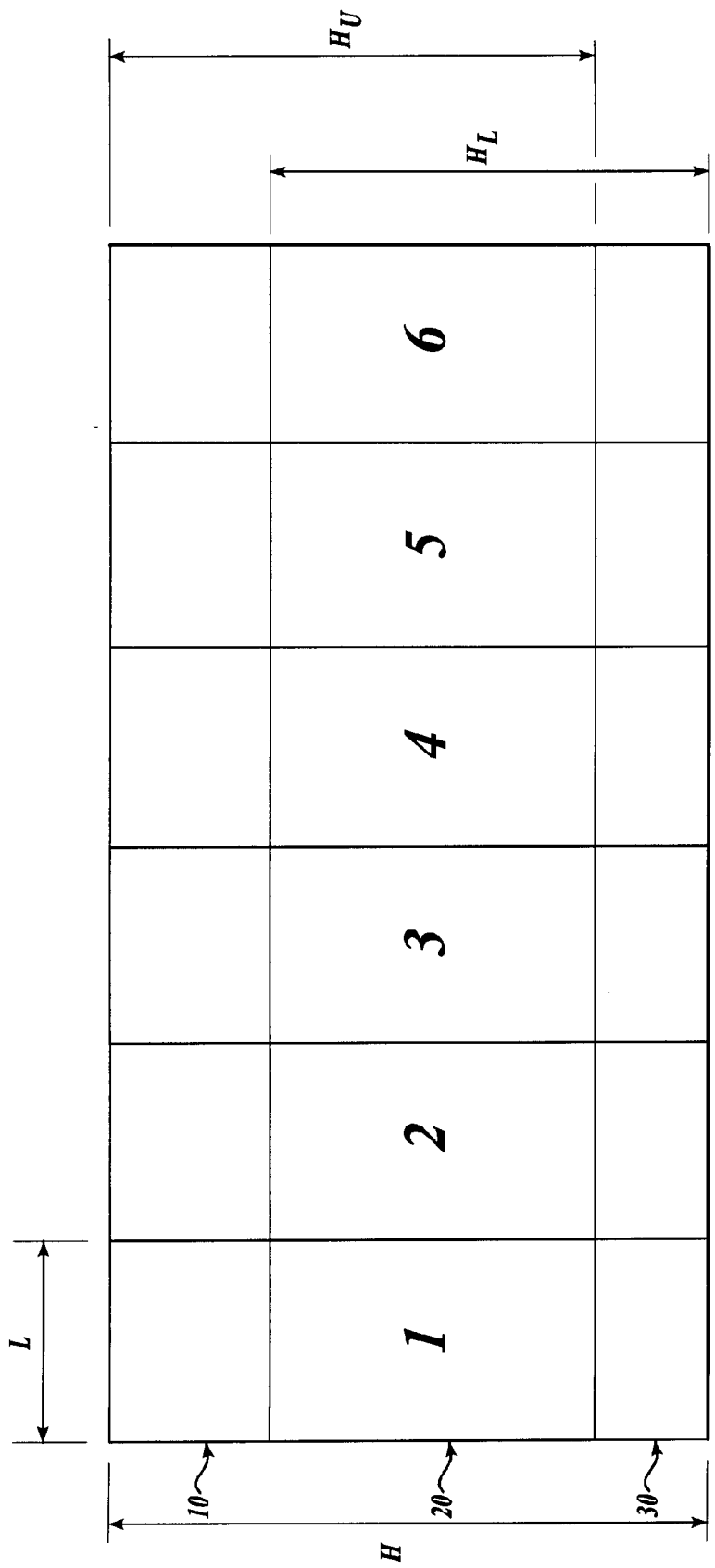
FIG. 1 is a schematic representation of an embodiment of the decorative wallpaper panels of the invention.

The invention provides customizable decorative wall panels, comprised of a thin sheet of paper, vinyl or other like substrate, which provides a coherent design not having a repeating pattern, when the sheets or panels of wallpaper are aligned side by side in the correct order. The decorative image or design may comprise, for example, a landscape, a cityscape, a still life, an abstract or any other design that is aesthetically pleasing or required for a particular purpose. Importantly, although the wallpaper does not include a repeating pattern that must be matched in side-by-side adhered sheets, as in prior art wallpapers, this does not preclude the invention's repetitive use of certain images, for example, images of a particular word, or a particular image. A commercial establishment may, for example, wish to intersperse its trademark at various points in the scene depicted in the wallpaper. However, the placement of these words or images, although they may be in a repetitive sequence, do not constitute the type of repetitive pattern that is necessary in prior art wallpapers to enable alignment of the papers to produce a coherent design on a wall.

In the specification and claims, a "digital image" refers to the type of image electronically stored by a computer, whether it be in random access memory, on a hard disk, or in any other storage medium known to be used by computers. The term "design," when referring to the wallpaper of the invention, refers to a decoration that does not have a repeating pattern, which characterizes prior art wallpaper. The wallpaper may encompass any design, in much the same way that painted murals depict a wide variety of subject matter. The term "features personal to the customer" means those features that the customer selects either from an array of options presented by the party customizing the wallpaper for the customer, or that the customer provides on its own accord, to suit its own particular purposes. These features may include modifications to the basic designs shown (for example, modifying a scene to include additional persons; modifying the appearance of persons in the basic design; adding images of other people; modifying background scenery; modifying size and shape of certain objects in the design; modifying the color scheme; and countless other details of personal choice that may be applied to artwork for personal aesthetic satisfaction). In the specification and claims, the term "visual image" is used to distinguish from a "digital image." The term "visual image" refers to the decorative design that is ultimately printed onto the customized wallpaper panels of the invention, and not to the digitized binary image in the computer or computer readable memory. In the specification and claims, the term "panels" does not refer to solid or hard panels such as wooden panels. Instead, the term "panels" refers to each of the separate strips of wallpaper that are necessary to complete a visual image in accordance with the invention, for example, the six panels shown in FIG. 1.

FIG. 1 represents an embodiment of the invention. It depicts a series of six contiguous panels arranged in a particular order. The panels have an overall height (H) and each panel has an overall width (L). Typically, it is anticipated that H will be approximately 10 ft., to reach from the top to the bottom of a standard 10 ft. wall. Of course, as explained below, H may be any height, depending upon the height of the wall that a customer wants to cover. The width L of each panel is typically approximately 4 ft. However, narrower or wider panels may also be produced, depending upon both customer needs and the available widths in which substrate is supplied.

As indicated, each of the panels has an upper section 10 (about 2' high), a middle section 20, and a lower section 30 (about 2' high). In accordance with the invention, a coherent visual image with a non-repeating pattern covers all six panels and each of the upper, middle and lower sections of these panels to provide a complete picture. Notwithstanding, in accordance with the invention, a customer may select not to use the upper section 10 of each of the panels. The decorative visual image produced by middle section 20 and lower section 30 of each of the panels, when they are arranged in proper order, will yet produce a coherent and visually pleasing image. Similarly, the customer may elect not to use the lower portion 30 of each of the panels. In this circumstance, the upper sections 10 and middle sections 20 of the panels, when arranged in proper sequence, yet produce a coherent and visually pleasing image. Finally, a customer may elect to use only certain contiguous panels. For example, a customer may elect to use only panels 1–4 or 3–6. Under this circumstance, the contiguous panels selected, whether full panels or lacking upper or lower sections, yet produce a coherent and visually pleasing image, when arranged in proper sequence.

From the above explanation, it is apparent that a customer presented with display copies of basic designs in accordance with the invention would have a variety of options to customize the size and design of the wallpaper. When less than the full basic design displayed is selected, this design may be referred to as a "subdesign." Thus, for example, if a customer were to select only panels 1–4, then this reduced-size design would be a "subdesign" of the full design of FIG. 1 that requires six panels. Likewise, if the customer were to select all six panels, without upper sections 10 or the lower sections 30, then this would also be referred to as a subdesign. Since the basic designs are digitized, a selected subdesign may be "blown up" to full size when a visual image is created for printing onto wallpaper substrates.

Figure 2:
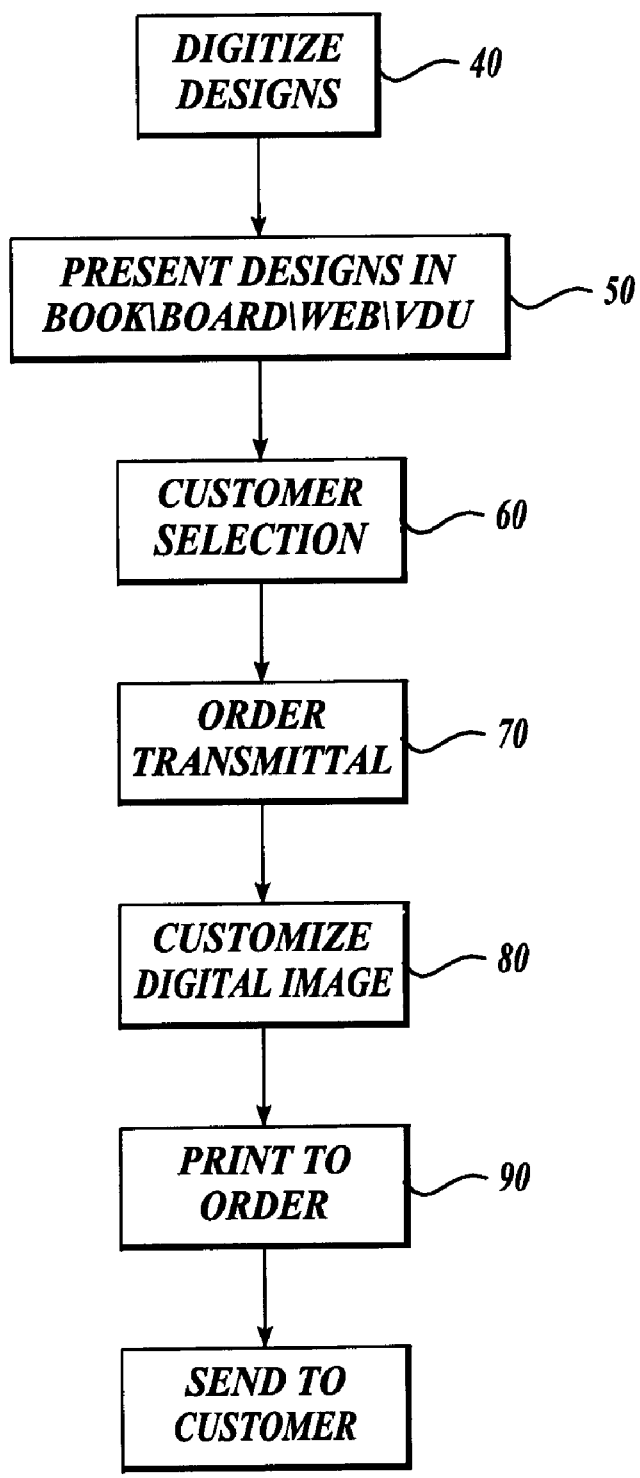
FIG. 2 is a schematic flow diagram of steps of an embodiment of a method in accordance with the invention.
Figure 3A:
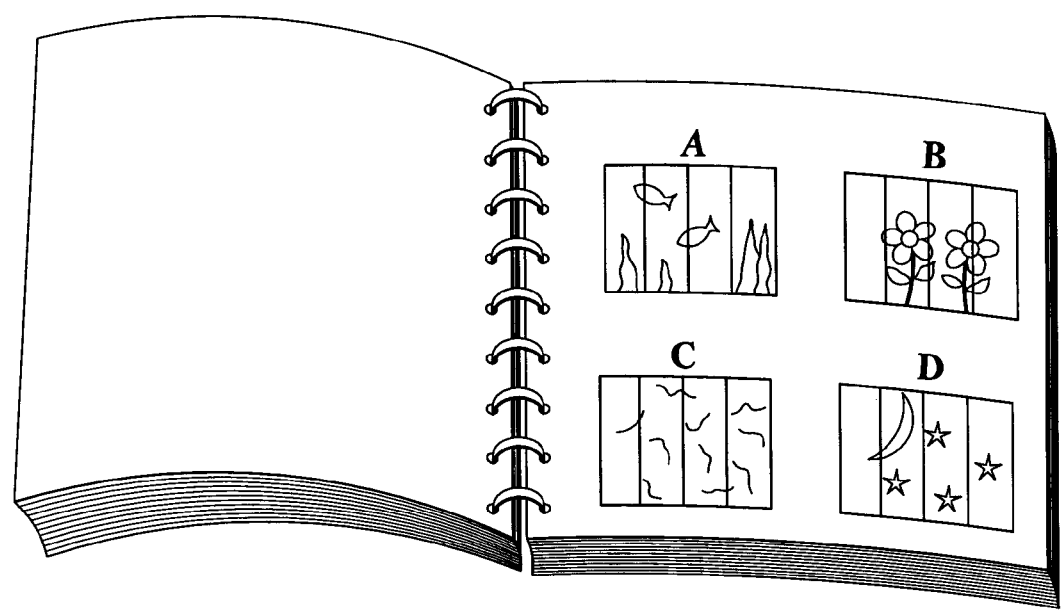
FIG. 3A is a perspective view of an open book showing a schematic of customizable wallpaper panels for customer selection.
Figure 3B:
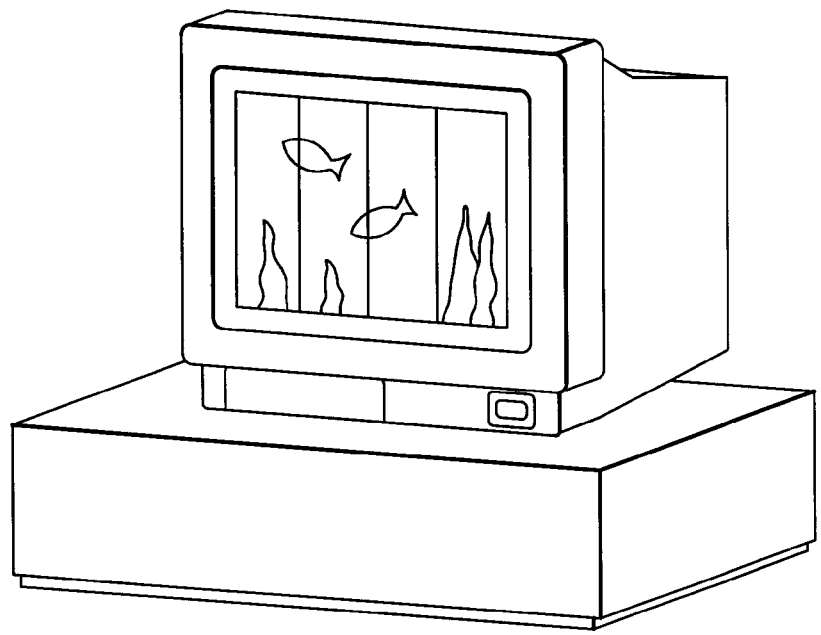
FIG. 3B is a schematic diagram of a video display unit, displaying decorative wall panels in accordance with an embodiment of the invention.

In accordance with the invention, initial basic designs are selected. These visual images do not have repeating patterns that are typical of prior art wallpaper, as explained above. Rather, they are more like murals, except that they are customizable. Referring to FIG. 2, a flow chart of the method in accordance with the invention, the initially selected basic designs are digitized 40. Samples of the digitized basic designs may be printed as visual designs on papers, books (see FIG. 3A), or boards or may be displayed at a Web site or a video display unit (see FIG. 3B) or in some other medium to enable potential customers to review the designs. The designs would be presented in visual format, with panels similar to the embodiment shown in FIG. 1. A customer may then make a selection from the display designs 60. During customer selection, as explained above, the customer may select customizing details ("features personal to the customer"). An order for the specific design of wallpaper along with customizing information is then transmitted to a source for producing the wallpaper 70. At the source, the digital image is customized 80 to customer's satisfaction. If necessary, visual images of the customized digital image may be printed on a smaller format paper for customer review before printing the wallpaper.

The customized wallpaper may be printed with any of a variety of existing technologies. One example of such technology is "raster image processing". In using this technique, the digital image is downloaded to a raster image processor which creates a mirror image of a visual design corresponding to the modified digital image on a substrate. The mirror image of the visual design is then transferred onto a suitable wallpaper substrate by heat lamination. A protective coating may optionally be applied over the printed design.

In an alternative printing method, printing includes modifying the digital image into a visual image, printing a reverse image of the visual image onto transfer paper, heat laminating the transfer paper image to a wallpaper substrate, applying a wet-transfer process to the combined transfer paper and wallpaper substrate sandwich, and finally removing the transfer paper and excess toner from the wallpaper substrate to produce a wallpaper with the printed customized image.

In a further alternative method, the customized design may be printed with an ink-jet printer directly onto the wallpaper substrate. The latter method is not preferred because the image produced is presently not as sharply defined as may be achieved with other printing techniques.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of providing customized wallpaper, the method comprising:
   (a) displaying copies of basic designs for wallpaper on a medium suitable for customer viewing, each of the basic designs comprising contiguous panel portions, one or more contiguous panel portions being selectable by a customer, the basic designs not having repeating patterns, and customer-selectable portions of the basic designs providing coherent subdesigns;
   (b) receiving wallpaper customizing information from a customer, the information comprising selection of at least one basic design and at least one coherent subdesign within the selected basic design;
   (c) relaying the customizing information to a source for customizing an existing digital image of the selected basic design, the customizing comprising incorporating the subdesign selection to the digital image to produce a customized digital image; and (d) printing the customized digital image onto a suitable medium for decorative use.

2. The method of claim 1, wherein the displaying of copies of basic designs comprises displaying on paper.

3. The method of claim 1, wherein the displaying of copies of basic designs comprises displaying on a video display unit, the unit being in electronic communication with a computer-readable memory containing stored digital images of the designs.

4. The method of claim 1, wherein the receiving of wallpaper customizing information further comprises receiving features personal to the customer, which are then relayed to the source for customizing an existing digital image of the selected basic design, and the customizing comprises incorporating the features personal to the customer to the digital image to produce a customized digital image.

5. The method of claim 1, wherein the receiving of wallpaper customizing information comprises receiving selection of only a central contiguous portion of the basic design, excluding end portions of the design.

6. The method of claim 1, wherein the receiving of wallpaper customizing information comprises receiving selection of a contiguous portion of the basic design, including at least one of the end portions of the design.

7. The method of claim 1, wherein the relaying of customizing information comprises relaying by electronic mail.

8. The method of claim 1, wherein the printing comprises:

(a) downloading the customized digital image onto a raster image processor;

(b) creating a mirror image of a visual design corresponding to the customized digital image on a substrate; and (c) transferring the visual design onto a wallpaper substrate by heat lamination.

9. The method of claim 1, further comprising, after printing, the application of a protective coating over the customized wallpaper.

10. The method of claim 1, wherein the printing comprises transforming the customized digital image into a visual image, printing a reverse image of the visual image onto transfer paper, heat laminating the transfer paper image to a wallpaper substrate, applying a wet-transfer process to the combined transfer paper and wallpaper substrate, and removing the transfer paper and excess toner from the wallpaper substrate to produce a wallpaper with design printed thereon.

11. The method of claim 1, wherein the printing comprises printing with an ink-jet printer directly onto a wallpaper substrate.

* * * * *